(12) United States Patent
Furukawa et al.

(10) Patent No.: US 8,964,228 B2
(45) Date of Patent: Feb. 24, 2015

(54) PRINTING SYSTEM, PRINTING METHOD, INFORMATION PROCESSING APPARATUS, AND NON-TRANSITORY COMPUTER READABLE MEDIUM

(71) Applicant: Fuji Xerox Co., Ltd., Minato-ku, Tokyo (JP)

(72) Inventors: Hitoshi Furukawa, Kanagawa (JP); Yoshitaka Itoh, Kanagawa (JP); Shintaro Murakami, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 28 days.

(21) Appl. No.: 13/947,748

(22) Filed: Jul. 22, 2013

(65) Prior Publication Data

US 2014/0055806 A1      Feb. 27, 2014

(30) Foreign Application Priority Data

Aug. 27, 2012  (JP) ................................. 2012-186793
May 30, 2013  (JP) ................................. 2013-114390

(51) Int. Cl.
*G06F 3/12*          (2006.01)
*G06F 21/60*        (2013.01)

(52) U.S. Cl.
CPC ............ *G06F 3/1293* (2013.01); *G06F 3/1222* (2013.01); *G06F 3/1238* (2013.01); *G06F 3/1288* (2013.01); *G06F 3/1292* (2013.01); *G06F 21/608* (2013.01)
USPC ........................ 358/1.15; 358/1.13; 358/1.14

(58) Field of Classification Search
CPC .............................. G06F 3/1292; G06F 21/608
USPC ................................................ 358/1.13–1.15
See application file for complete search history.

(56) References Cited

U.S. PATENT DOCUMENTS

| 7,190,471 | B2 * | 3/2007 | Sandfort et al. | 358/1.14 |
|---|---|---|---|---|
| 7,434,048 | B1 * | 10/2008 | Shapiro et al. | 713/165 |
| 8,570,566 | B2 * | 10/2013 | St. Laurent et al. | 358/1.15 |
| 8,711,393 | B2 * | 4/2014 | Fukano et al. | 358/1.15 |
| 2001/0013053 | A1 * | 8/2001 | Yamazaki | 709/203 |
| 2001/0046067 | A1 * | 11/2001 | Taniguchi | 358/1.15 |

(Continued)

FOREIGN PATENT DOCUMENTS

JP            2006-195765 A      7/2006

*Primary Examiner* — Dennis Dicker
(74) *Attorney, Agent, or Firm* — Sughrue Mion, PLLC

(57) ABSTRACT

A printing system includes following components. Each printing apparatus prints print document information and outputs a document. A terminal transmits print document information stored therein and location information. A print server receives, from the terminal, the print document information and the location information, generates authentication information in association with the print document information, identifies one printing apparatus in accordance with the received location information and location information of the printing apparatuses, and transmits the generated authentication information to the identified printing apparatus. The identified printing apparatus displays authentication reference information in accordance with the received authentication information. The terminal receives input of information based on the authentication reference information and transmits the input information to the print server. If the input information matches the authentication information, the print server transmits the print document information associated with the authentication information to the identified printing apparatus.

5 Claims, 14 Drawing Sheets

(56) References Cited

U.S. PATENT DOCUMENTS

| | | | |
|---|---|---|---|
| 2002/0115451 A1* | 8/2002 | Taniguchi et al. | 455/456 |
| 2004/0125401 A1* | 7/2004 | Earl et al. | 358/1.15 |
| 2004/0137855 A1* | 7/2004 | Wiley et al. | 455/88 |
| 2005/0128968 A1* | 6/2005 | Yang | 370/312 |
| 2006/0039025 A1* | 2/2006 | Krolczyk et al. | 358/1.15 |
| 2008/0117452 A1* | 5/2008 | Murakami | 358/1.15 |
| 2009/0033985 A1* | 2/2009 | Platov | 358/1.15 |
| 2012/0019867 A1* | 1/2012 | Prati et al. | 358/1.15 |

* cited by examiner

FIG. 5

| MULTIFUNCTION PERIPHERAL ID | LATITUDE | LONGITUDE |
|---|---|---|
| MFP-001 | 35.466188 | 139.622715 |
| MFP-002 | ... | ... |

| TERMINAL ID | LATITUDE | LONGITUDE | MULTIFUNCTION PERIPHERAL ID | DETECTION DATE AND TIME |
|---|---|---|---|---|
| SP-1000 | 35.4661 | 139.6227 | MFP-001 | 1/25/2012 16:50 |
| SP-1100 | 35.4662 | 139.6227 | MFP-001 | 1/25/2012 16:55 |

| FIGURE ID | MULTIFUNCTION PERIPHERAL ID | FIGURE GENERATION DATE AND TIME | VALIDITY EXPIRATION DATE AND TIME | TERMINAL ID | PRINT DOCUMENT ID |
|---|---|---|---|---|---|
| FIG-010 | MFP-001 | 1/25/2012 17:00 | 1/25/2012 17:10 | SP-1000 | DOC-001 |
| FIG-050 | MFP-002 | 1/25/2012 17:05 | 1/25/2012 17:15 | SP-1100 | DOC-002 |

214

FIG. 10
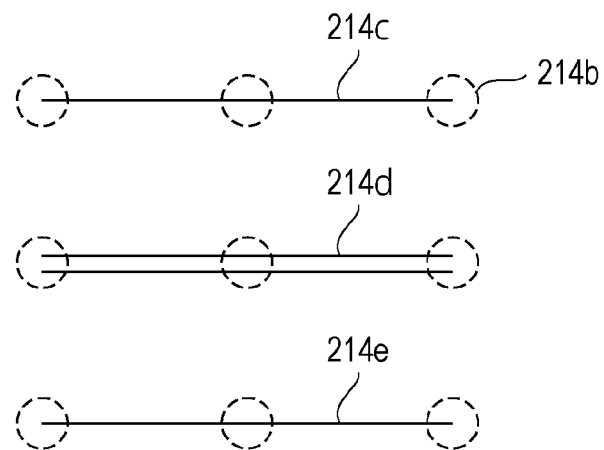
FIG. 11A  FIG. 11B
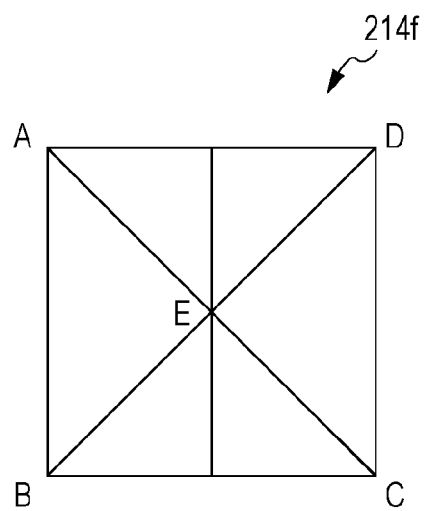
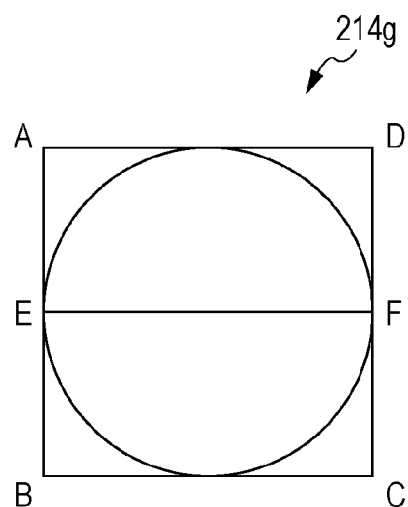
FIG. 11C  FIG. 11D
A → B → C → D → E        B → A → B → C → D → E

PRINTING SYSTEM, PRINTING METHOD, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-186793 filed Aug. 27, 2012 and Japanese Patent Application No. 2013-114390 filed May 30, 2013.

BACKGROUND

Technical Field

The present invention relates to a printing system, a printing method, an information processing apparatus, and a non-transitory computer readable medium.

SUMMARY

According to an aspect of the invention, there is provided a printing system including plural printing apparatuses, a terminal, and a print server. Each of the plural printing apparatuses prints print document information and outputs a document. The terminal stores print document information, acquires information on a location of the terminal and generates location information, and transmits the print document information and the location information. The print server receives, from the terminal, the print document information and the location information of the terminal, generates authentication information and associates the generated authentication information with the print document information, identifies one printing apparatus from among the plural printing apparatuses in accordance with the location information of the terminal and location information of the plural printing apparatuses, and transmits the generated authentication information to the identified printing apparatus. The identified printing apparatus displays authentication reference information in accordance with the authentication information received from the print server. The terminal receives input of information that is based on the authentication reference information and transmits the input information to the print server. Upon receipt of the input information from the terminal, if the input information matches the authentication information, the print server transmits the print document information associated with the authentication information to the identified printing apparatus.

BRIEF DESCRIPTION OF THE DRAWINGS

Exemplary embodiments of the present invention will be described in detail based on the following figures, wherein:

FIG. 5 illustrates an example of the structure of multifunction peripheral information;

FIG. 6 illustrates an example of the structure of terminal-multifunction peripheral association information;

FIG. 7 illustrates an example of the structure of authentication figure information;

FIG. 10 illustrates another example of the structure of an authentication figure displayed on the display unit of the multifunction peripheral;

FIGS. 11A to 11D illustrate other examples of the structure of an authentication figure displayed on the display unit of the multifunction peripheral;

DETAILED DESCRIPTION

First Exemplary Embodiment

Configuration of Printing System

Figure 1:
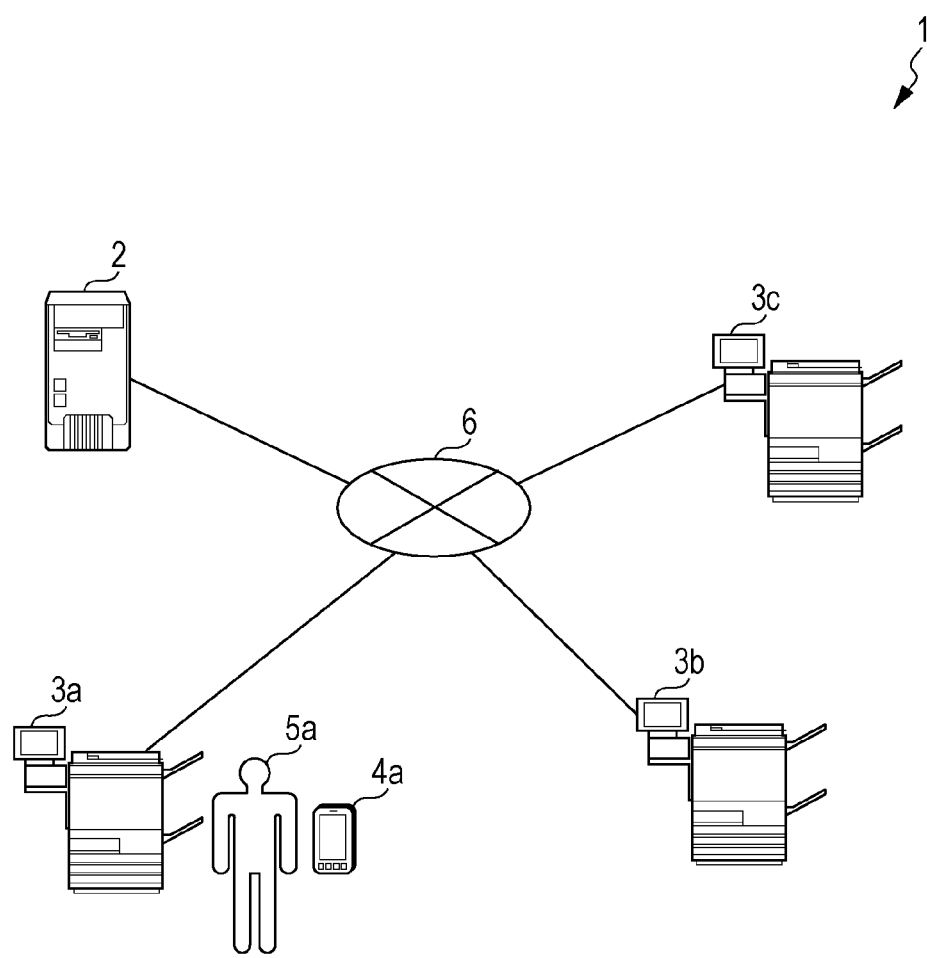
FIG. 1 is a block diagram illustrating an example of the configuration of a printing system according to a first exemplary embodiment of the present invention.

FIG. 1 is a block diagram illustrating an example of the configuration of a printing system according to a first exemplary embodiment of the present invention.

In the first exemplary embodiment of the present invention, a printing system 1 includes a print server 2, multifunction peripherals 3a to 3c, and a mobile terminal 4a carried by a user 5a. The print server 2, the multifunction peripherals 3a to 3c, and the mobile terminal 4a are connected to each other via a network 6 so as to be able to communicate with each other.

The print server 2 is an information processing apparatus including electronic components, such as a central processing unit (CPU) which has a function of processing information and a memory. The print server 2 receives document information, such as an image or a document, from the mobile terminal 4a; and stores the document information in association with the mobile terminal 4a. The print server 2 also generates authentication figure information in association with the mobile terminal 4a, and transmits the authentication figure information to a multifunction peripheral (for example, 3a) located in the vicinity of the mobile terminal 4a. If authentication based on the authentication figure information is successful, the print server 2 further transmits print information corresponding to the registered document information to the multifunction peripheral 3a.

The multifunction peripherals 3a to 3c each are an example of a printing apparatus in the first exemplary embodiment.

The multifunction peripherals 3a to 3c each have at least a printing function of performing printing in accordance with print information received from the print server 2 and outputting a printed material. The multifunction peripherals 3a to 3c may each additionally have a scanner function of optically scanning the surface of paper or the like, a facsimile function, or the like. The multifunction peripherals 3a to 3c each further include a display unit, such as a liquid crystal display (LCD), and an operation unit which includes a touch screen or multiple operation keys. The multifunction peripherals 3a to 3c are installed at different locations.

The mobile terminal 4a communicates with the print server 2 via a wireless communication network (not illustrated). The mobile terminal 4a includes an operation unit including a keyboard, a mouse, and a touch screen for input operation; a display unit, such as an LCD; and a controller including electronic components, such as a CPU and a memory. The mobile terminal 4a transmits a request to the print server 2 in response to an operation performed by the user 5a. The mobile terminal 4a also receives a response to the request, and displays on the display unit a result of processing the received content by the controller. The mobile terminal 4a is, for example, a personal computer. Alternatively, a personal digital assistant (PDA), a mobile phone, or the like may be used. FIG. 1 illustrates one mobile terminal 4a but there may be multiple mobile terminals 4a.

The network 6 is a wired or wireless communication network, such as the Internet or a local area network (LAN).

In the above-described printing system 1, the user 5a registers document information in the print server 2 by using the mobile terminal 4a; and transmits location information, which represents the current location of the mobile terminal 4a, to the print server 2. Upon receipt of the location information, the print server 2 transmits authentication figure information described later to a multifunction peripheral (for example, 3a) located in the vicinity of (for example, located nearest) the mobile terminal 4a. The user 5a checks an authentication figure displayed on the display unit of the multifunction peripheral 3a and performs an input operation for authentication in accordance with authentication figure on the mobile terminal 4a. In this way, information corresponding to the input operation is transmitted from the mobile terminal 4a to the print server 2. If the authentication performed by the print server 2 using the information is successful, the print server 2 transmits print information corresponding to the document information registered by the user 5a to the multifunction peripheral 3a.

Configuration of Print Server

Figure 2:
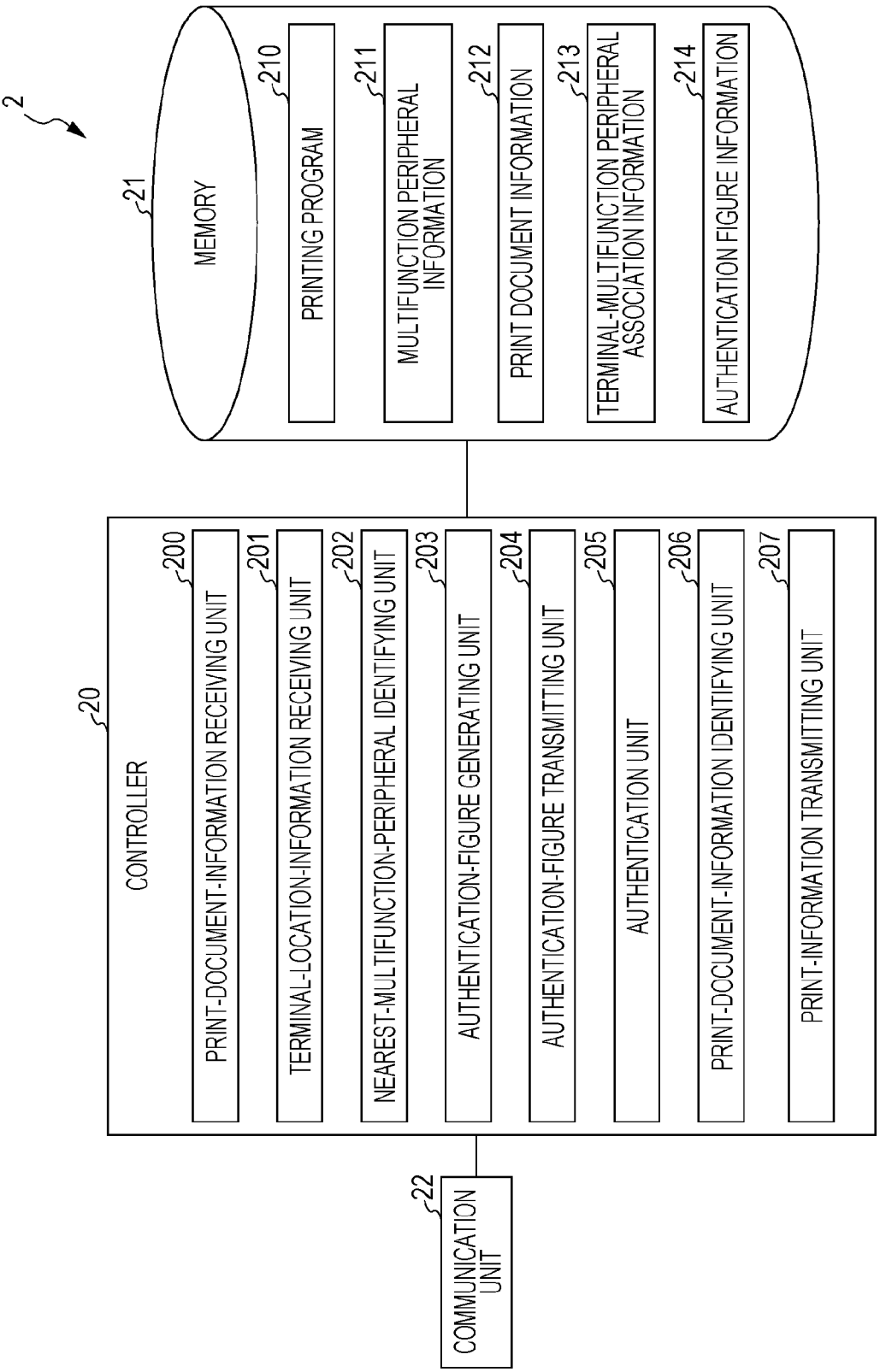
FIG. 2 is a block diagram illustrating an example of the configuration of a print server according to the first exemplary embodiment.

FIG. 2 is a block diagram illustrating an example of the configuration of the print server 2 according to the first exemplary embodiment.

This print server 2 includes a controller 20, a memory 21, and a communication unit 22. The controller 20 includes a CPU, controls each unit, and executes various programs. The memory 21 includes a recording medium, such as a hard disk drive (HDD) or a flash memory, and serves as an example of a memory device that stores information. The communication unit 22 communicates with an external apparatus via the network 6.

The controller 20 executes a printing program 210 described later, thereby functioning as a print-document-information receiving unit 200, a terminal-location-information receiving unit 201, a nearest-multifunction-peripheral identifying unit 202, an authentication-figure generating unit 203, an authentication-figure transmitting unit 204, an authentication unit 205, a print-document-information identifying unit 206, a print-information transmitting unit 207, and so forth.

The print-document-information receiving unit 200 receives print document information transmitted from, for example, the mobile terminal 4a, and stores it as print document information 212 in the memory 21.

The terminal-location-information receiving unit 201 receives location information transmitted from the mobile terminal 4a, and records it in terminal-multifunction peripheral association information 213 stored in the memory 21.

The nearest-multifunction-peripheral identifying unit 202 identifies a multifunction peripheral located in the vicinity of (for example, located nearest) the mobile terminal 4a in accordance with the location information of the mobile terminal 4a and multifunction peripheral information 211 described later, and records identification information of the identified multifunction peripheral in the terminal-multifunction peripheral association information 213.

The authentication-figure generating unit 203 generates an authentication figure used by the multifunction peripherals 3a to 3c during authentication of the mobile terminal 4a. The authentication-figure generating unit 203 associates the generated authentication figure with identification information (hereinafter, referred to as an "ID") of the mobile terminal 4a, the ID of the multifunction peripheral identified by the nearest-multifunction-peripheral identifying unit 202, and the ID of the print document information; and records them as authentication figure information 214.

The authentication-figure transmitting unit 204 transmits the authentication figure information 214 generated by the authentication-figure generating unit 203, to the multifunction peripheral identified by the nearest-multifunction-peripheral identifying unit 202.

The authentication unit 205 authenticates the mobile terminal 4a, if an authentication figure is input to the mobile terminal 4a on the basis of the authentication figure displayed on the multifunction peripheral to which the authentication figure information 214 has been transmitted.

The print-document-information identifying unit 206 identifies the print document information 212 associated with the authentication figure used in the successful authentication, in accordance with the authentication figure information 214.

The print-information transmitting unit 207 converts the print document information 212 identified by the print-document-information identifying unit 206 into print information which is printable by the multifunction peripheral, and transmits the print information to the multifunction peripheral identified by the nearest-multifunction-peripheral identifying unit 202.

The memory 21 stores the printing program 210, the multifunction peripheral information 211, the print document information 212, the terminal-multifunction peripheral association information 213, the authentication figure information 214, and so forth.

The printing program 210 is a program that causes the controller 20 to operate as the print-document-information receiving unit 200, the terminal-location-information receiving unit 201, the nearest-multifunction-peripheral identifying unit 202, the authentication-figure generating unit 203, the authentication-figure transmitting unit 204, the authentication unit 205, the print-document-information identifying unit 206, and the print-information transmitting unit 207.

The multifunction peripheral information 211 is information that manages the IDs of the multifunction peripherals 3a to 3c and pieces of location information about locations where the multifunction peripherals 3a to 3c are installed.

The print document information 212 is print document information that is received by the print-document-information receiving unit 200 from the mobile terminal 4a.

The terminal-multifunction peripheral association information 213 is information that associates location information of the mobile terminal 4a received by the terminal-location-information receiving unit 201 with the ID of the multifunction peripheral located nearest the mobile terminal 4a and identified by the nearest-multifunction-peripheral identifying unit 202.

The authentication figure information 214 is information that associates an authentication figure generated by the authentication-figure generating unit 203, the ID of the multifunction peripheral to which the authentication figure is transmitted, and the ID of the mobile terminal 4a to which the authentication figure is to be input with each other.

Configuration of Multifunction Peripheral

Figure 3:
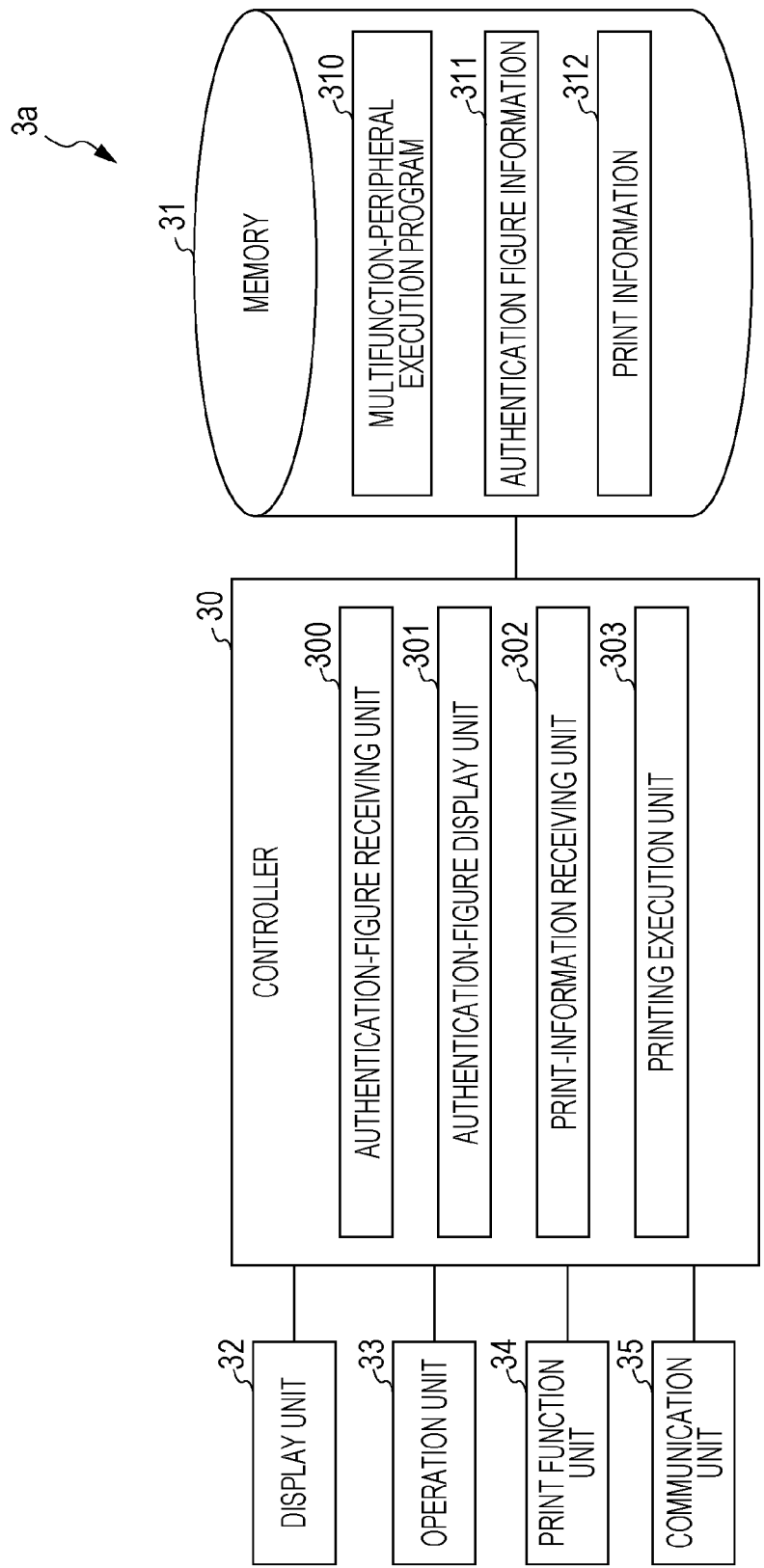
FIG. 3 is a block diagram illustrating an example of the configuration of a multifunction peripheral according to the first exemplary embodiment.

FIG. 3 is a block diagram illustrating an example of the configuration of the multifunction peripheral 3a according to the first exemplary embodiment. Note that the multifunction peripherals 3b and 3c have the configuration similar to that of the multifunction peripheral 3a, and thus a description thereof is omitted.

The multifunction peripheral 3a includes a controller 30, a memory 31, a display unit 32 such as an LCD, an operation unit 33, a print function unit 34, and a communication unit 35. The controller 30 includes a CPU, controls each unit, and executes various programs. The memory 31 includes a recording medium, such as an HDD or a flash memory, and serves as an example of a memory device that stores information. The operation unit 33 includes a touch screen or multiple operation keys. The print function unit 34 performs printing in accordance with print information received from the print server 2, and outputs a printed material (for example, a document). The communication unit 35 communicates with an external apparatus via the network 6.

The controller 30 executes a multifunction-peripheral execution program 310 stored in the memory 31, thereby functioning as an authentication-figure receiving unit 300, an authentication-figure display unit 301, a print-information receiving unit 302, a printing execution unit 303, and so forth.

The authentication-figure receiving unit 300 receives the authentication figure information 214 from the print server 2, and stores it as authentication figure information 311 in the memory 31.

The authentication-figure display unit 301 displays the authentication figure information 311 on the display unit 32 at a timing described later.

The print-information receiving unit 302 receives print information from the print server 2, and stores it as print information 312 in the memory 31.

The printing execution unit 303 causes the print function unit 34 to print the print information 312.

Configuration of Mobile Terminal

Figure 4:
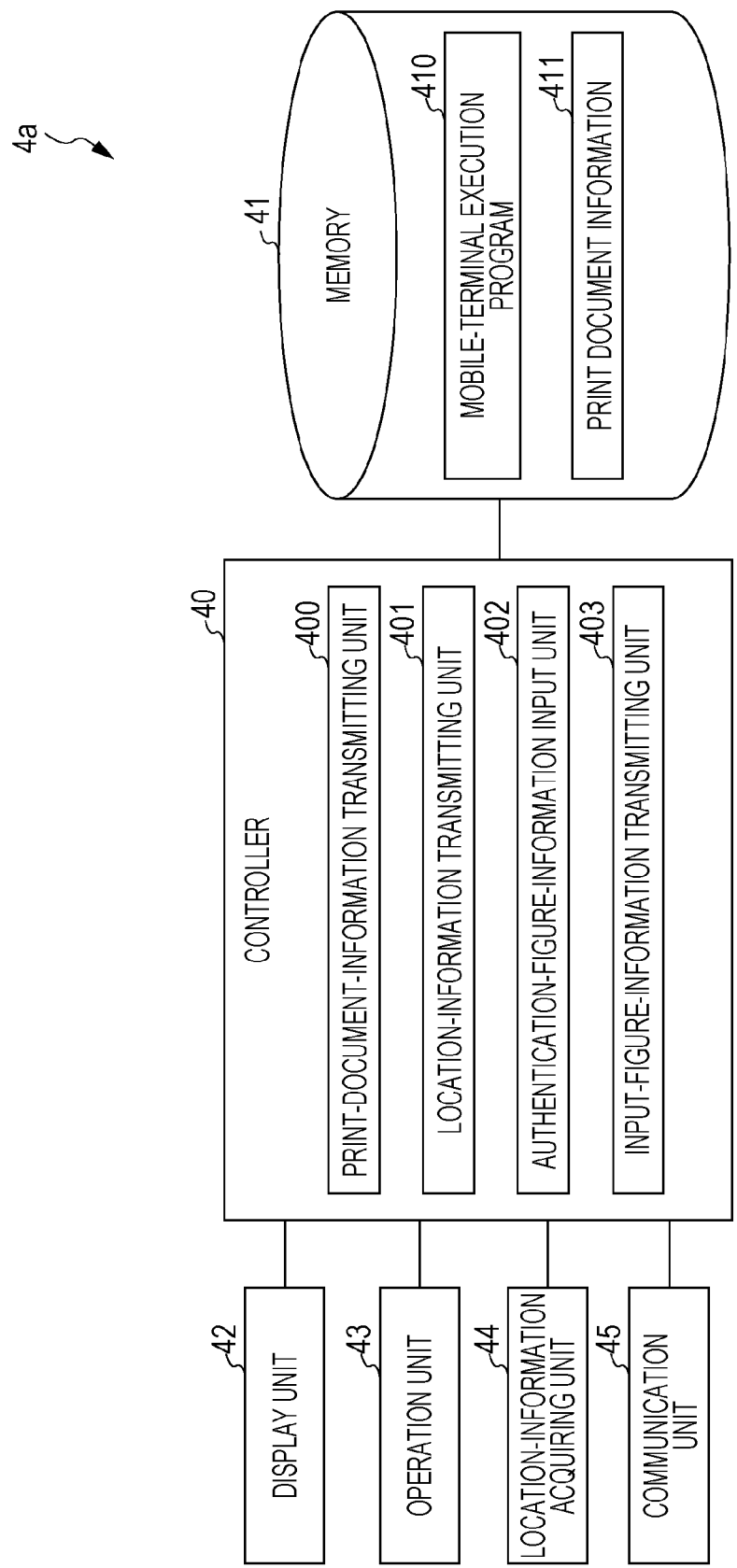
FIG. 4 is a block diagram illustrating an example of the configuration of a mobile terminal according to the first exemplary embodiment.

FIG. 4 is a block diagram illustrating an example of the configuration of the mobile terminal 4a according to the first exemplary embodiment.

The mobile terminal 4a includes a controller 40, a memory 41, a display unit 42 such as an LCD, an operation unit 43, a location-information acquiring unit 44, and a communication unit 45. The controller 40 includes a CPU, controls each unit, and executes various programs. The memory 41 includes a recording medium, such as an HDD or a flash memory, and serves as an example of a memory device that stores information. The operation unit 43 includes a touch screen or multiple operation keys. The location-information acquiring unit 44 acquires location information of the mobile terminal 4a using the global positioning system (GPS). The communication unit 45 communicates with an external apparatus via the network 6.

The controller 40 executes a mobile terminal execution program 410 stored in the memory 41, thereby functioning as a print-document-information transmitting unit 400, a location-information transmitting unit 401, an authentication-figure-information input unit 402, an input-figure-information transmitting unit 403, and so forth.

The print-document-information transmitting unit 400 transmits print document information 411 stored in the memory 41 to the print server 2.

The location-information transmitting unit 401 transmits the location information acquired by the location-information acquiring unit 44 to the print server 2.

The authentication-figure-information input unit 402 displays a screen on the display unit 42 to receive input of an authentication figure, and inputs an authentication figure on the basis of an operation performed by the user 5a on the operation unit 43.

The input-figure-information transmitting unit 403 transmits input figure information input by the authentication-figure-information input unit 402 to the print server 2.

FIG. 5 illustrates an example of the structure of the multifunction peripheral information 211.

The multifunction peripheral information 211 includes a multifunction peripheral ID field which indicates each ID for identifying a corresponding one of the multifunction peripherals 3a to 3c, a longitude field which indicates a longitude where the multifunction peripheral is installed, and a latitude field which indicates a latitude where the multifunction peripheral is installed.

FIG. 6 illustrates an example of the structure of the terminal-multifunction peripheral association information 213.

The terminal-multifunction peripheral association information 213 includes a terminal ID field which indicates each ID for identifying a corresponding mobile terminal (for example, 4a), a longitude field which indicates a longitude of the location of the mobile terminal 4a, a latitude field which indicates a latitude of the location of the mobile terminal 4a, a multifunction peripheral ID field which indicates the ID of the multifunction peripheral located nearest the mobile terminal 4a, and a detection date and time field which indicates the date and time at which the location information received by the print server 2 from the mobile terminal 4a has been detected.

FIG. 7 illustrates an example of the structure of the authentication figure information 214.

The authentication figure information 214 includes a FIG. 1D field which indicates each ID for identifying a corresponding authentication figure, a multifunction peripheral ID field which indicates the ID of a multifunction peripheral to which the authentication figure is transmitted, a figure generation date and time field which indicates the date and time at which the authentication figure has been generated, a validity expiration date and time field which indicates the expiration date and time to which the authentication figure is usable in authentication, a terminal ID field which indicates the ID of a mobile terminal to which the authentication figure is to be input, and a document ID field which indicates the ID of print document information associated with the authentication figure.

Operation in Printing System

Now, operation according to the first exemplary embodiment will be described for 1) a document information reception operation, 2) an authentication operation, and 3) a printing operation.

Figure 9:
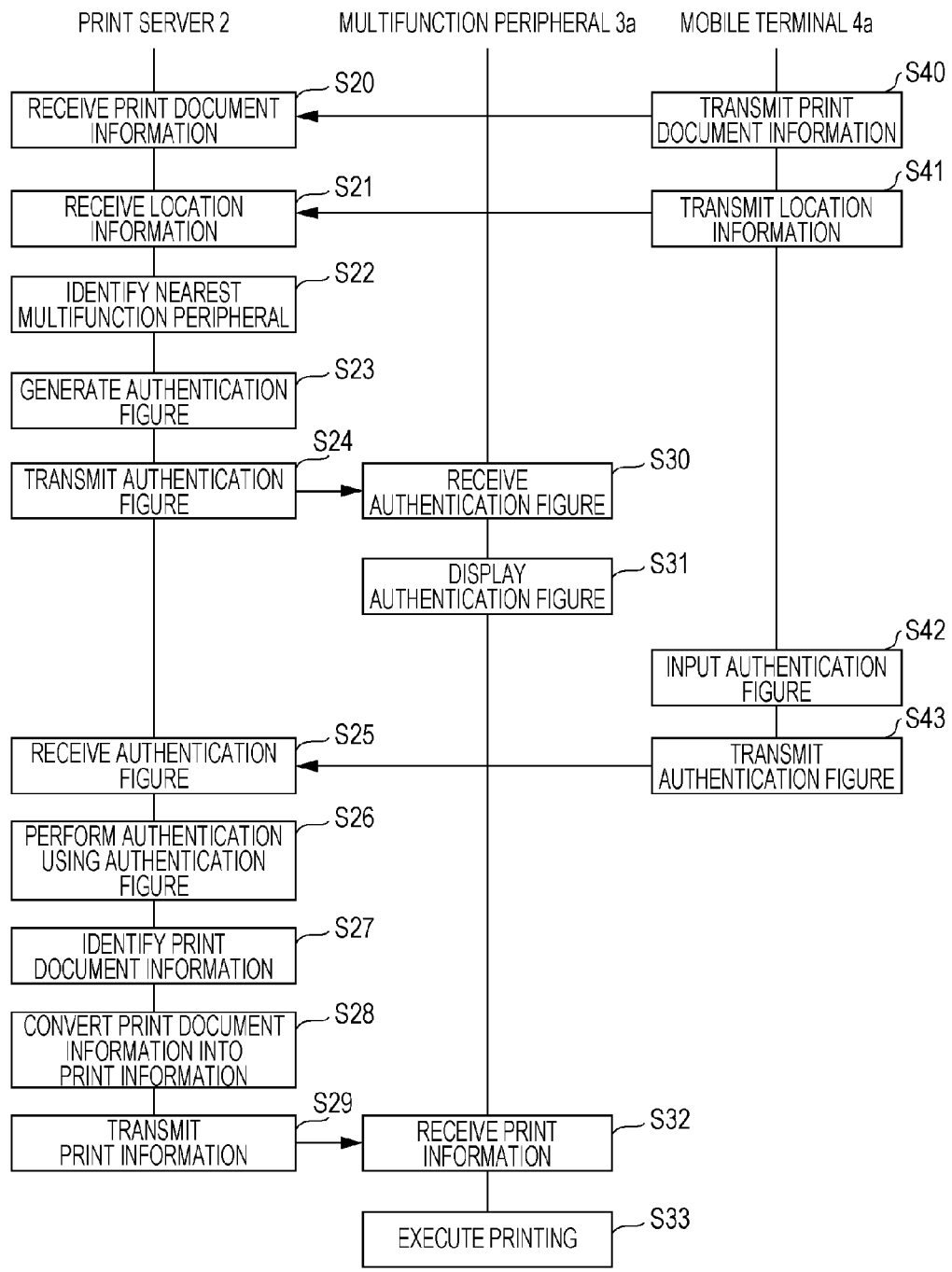
FIG. 9 is a flowchart illustrating an example of an operation performed in the printing system according to the first exemplary embodiment.

FIG. 9 is a flowchart illustrating an example of an operation performed in the printing system 1 according to the first exemplary embodiment.

1) Document Information Reception Operation

First, the user 5a operates the mobile terminal 4a and initiates communication with the print server 2 in order to register in the print server 2 the desired print document information 411 to be printed. When initiating communication, the user 5a may first input the user ID, which is user identification information, and a password to the mobile terminal 4a; and the mobile terminal 4a may request the print server 2 to perform authentication.

Upon permitting registration, the print server 2 generates a unique registration identifier that represents print information to be registered this time. The print server 2 then transmits registration permission information which contains the generated registration identifier to the mobile terminal 4a.

Upon receipt of the registration permission information, the print-document-information transmitting unit 400 of the mobile terminal 4a transmits a registration request and the print document information 411 to the print server 2 (S40). Also, the location-information acquiring unit 44 of the mobile terminal 4a acquires information on the current location, for example, "latitude 35.4661, longitude 139.6227" at a detection date and time "Jan. 25, 2012 16:50". The location-information transmitting unit 401 then transmits the location information to the print server 2 (S41). The mobile terminal 4a also stores the registration identifier contained in the registration permission information, in the memory 41.

The print-document-information receiving unit 200 of the print server 2 receives the registration request and the print document information 411 (S20), and stores the print document information 411 as the print document information 212 in the memory 21.

Also, the terminal-location-information receiving unit 201 of the print server 2 receives the location information transmitted from the mobile terminal 4a (S21), and stores the location information "latitude 35.4661, longitude 139.6227" and the detection date and time "Jan. 25, 2012 16:50" in the terminal-multifunction peripheral association information 213 illustrated in FIG. 6.

Subsequently, the nearest-multifunction-peripheral identifying unit 202 identifies the multifunction peripheral 3a (MFP-001) ("latitude 35.466188, longitude 139.622715") located in the vicinity of (for example, located nearest) the mobile terminal 4a, in accordance with the location information "latitude 35.4661, longitude 139.6227" of the mobile terminal 4a and the multifunction peripheral information 211 stored in the memory 21 illustrated in FIG. 5 (S22). The nearest-multifunction-peripheral identifying unit 202 stores the ID of the identified multifunction peripheral in the terminal-multifunction peripheral association information 213 illustrated in FIG. 6.

2) Authentication Operation

Subsequently, the authentication-figure generating unit 203 generates an authentication figure "FIG. 010" used by the multifunction peripheral 3a during authentication of the mobile terminal 4a (S23). The authentication-figure generating unit 203 associates the generated figure with the ID "SP-1000" of the mobile terminal 4a and the ID "MFP-001" of the multifunction peripheral 3a identified by the nearest-multifunction-peripheral identifying unit 202 and stores them as the authentication figure information 214 illustrated in FIG. 7. The authentication figure information 214 may be stored in association with the registration identifier.

At this time, the authentication-figure generating unit 203 sets, as the validity expiration date and time of the authentication figure, a time point that is a predetermined period after the figure generation date and time "Jan. 25, 2012 17:00". For example, the authentication-figure generating unit 203 sets "Jan. 25, 2012 17:10" which is ten minutes later.

The authentication-figure transmitting unit 204 transmits the authentication figure "FIG. 010" generated by the authentication-figure generating unit 203 to the multifunction peripheral 3a ("MFP-001") identified by the nearest-multifunction-peripheral identifying unit 202 (S24).

Then, the authentication-figure receiving unit 300 of the multifunction peripheral 3a receives the authentication figure from the print server 2 (S30) and stores the authentication figure as the authentication figure information 311 in the memory 31. The authentication-figure display unit 301 displays the content of the authentication figure "FIG. 010" on the display unit 32 (S31).

Figure 8:
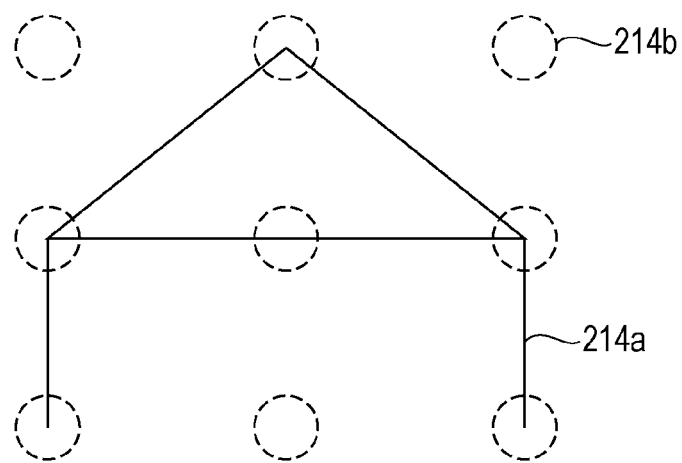
FIG. 8 illustrates an example of the structure of an authentication figure displayed on a display unit of the multifunction peripheral.

FIG. 8 illustrates an example of the structure of an authentication figure displayed on the display unit 32 of the multifunction peripheral 3a.

An authentication FIG. 214a is constituted by a set of lines that link ancillary FIG. 214b which are guides for input positions. In the example illustrated in FIG. 8, the authentication FIG. 214a is the alphabetical character "A". Note that the ancillary FIG. 214b may be omitted when the authentication FIG. 214a is displayed on the display unit 32 of the multifunction peripheral 3a.

Subsequently, the user 5a checks the authentication FIG. 214a displayed on the display unit 32 of the multifunction peripheral 3a, and performs an operation on the mobile terminal 4a to get ready for an input operation.

The authentication-figure-information input unit 402 of the mobile terminal 4a displays, on the display unit 42, a screen for receiving input of an authentication figure. For example, this screen includes only the ancillary FIG. 214b illustrated in FIG. 8. The screen for receiving input of an authentication figure may be displayed upon the user starting an application pre-installed in the mobile terminal 4a. Alternatively, the screen may be displayed in the following manner. After transmitting the authentication figure to the multifunction peripheral 3a, the print server 2 transmits, to the mobile terminal 4a, an instruction to display a screen for receiving input of an authentication figure, the instruction containing the registration identifier corresponding to this registration operation. Upon receipt of the instruction to display the input screen from the print server 2, the mobile terminal 4a determines whether the registration identifier contained in the instruction is stored in the memory 41. If the registration identifier is stored in the memory 41, the authentication-figure-information input unit 402 of the mobile terminal 4a displays the screen for receiving input of an authentication figure on the display unit 42.

If the registration identifier contained in the instruction is not stored in the memory 41, the mobile terminal 4a need not display a screen for receiving input of an authentication figure on the display unit 42. Alternatively, the multifunction peripheral 3a may transmit display confirmation information, which indicates that the authentication figure has been displayed, to the print server 2 after displaying the authentication figure. The print server 2 may transmit the instruction to display the screen for receiving input of an authentication figure to the mobile terminal 4a, after receiving the display confirmation information transmitted from the multifunction peripheral 3a.

Then, in accordance with the ancillary FIG. 214b displayed on the display unit 42 of the mobile terminal 4a, the user 5a performs an input operation on the operation unit 43, such as a touch screen, with a finger or the like so as to reproduce the authentication FIG. 214a displayed on the display unit 32 of the multifunction peripheral (S42).

Subsequently, the input-figure-information transmitting unit 403 of the mobile terminal 4a transmits input figure information input by the user 5a to the print server 2 (S43). At this time, the registration identifier corresponding to this operation may be attached to the input figure information.

The authentication unit 205 of the print server 2 receives the input figure information transmitted from the input-figure-information transmitting unit 403 of the mobile terminal 4a (S25), and compares the input figure information with the authentication figure information 214 for verification. If the figures match at a predetermined percentage or higher, the print server 2 authenticates the user (S26). If the registration identifier is transmitted with the input figure information, the input figure information may be compared with the authentication figure information 214 corresponding to the registration identifier. Also, the stroke order of the figure (an order in which the figure is drawn) may be included in authentication conditions.

In the case where multiple users are in the vicinity of a single multifunction peripheral, the order of authentication may be determined in accordance with an order in which pieces of print document information are registered in the print server 2, an order of print requests, or the like, and the determined order may be displayed on the display unit 32 of the multifunction peripheral or the display unit 42 of the mobile terminal 4a. In this case, a printing waiting time may be reduced by transmitting pieces of print information corresponding to the multiple users from the print server 2 to the multifunction peripheral beforehand.

3) Printing Operation

Subsequently, the print-document-information identifying unit 206 identifies print document information "DOC-001" associated with the authentication figure "FIG-010" used in the successful authentication, in accordance with the authentication figure information 214 illustrated in FIG. 7 (S27).

The print-information transmitting unit 207 converts the print document information "DOC-001" identified by the print-document-information identifying unit 206 into print information which is printable by the multifunction peripheral (S28), and transmits the print information to the multifunction peripheral 3a (MFP-001) identified by the nearest-multifunction-peripheral identifying unit 202 (S29).

The print-information receiving unit 302 of the multifunction peripheral 3a receives the print information from the print server 2 (S32), and stores it as the print information 312 in the memory 31.

Then, the printing execution unit 303 of the multifunction peripheral 3a displays on the display unit 32 a message "ready to print" and a print start button or the like.

The user 5a operates the multifunction peripheral 3a to execute printing.

Upon the user 5a performing an operation to start printing on the operation unit 33, the print function unit 34 prints the print information 312 (S33).

Modifications

It should be noted that the present invention is not limited to the first exemplary embodiment above and may be variously modified within the scope not departing from the gist of the present invention. For example, the following modifications may be made.

FIG. 10 illustrates another example of the structure of an authentication figure displayed on the display unit 32 of the multifunction peripheral 3a.

Authentication FIGS. 214c, 214d, and 214e are constituted by sets of lines that link the ancillary FIG. 214b which are guides for input positions. In the example illustrated in FIG. 10, the authentication FIG. 214d is drawn with a double line. This indicates that the authentication FIG. 214d is input, for example, through a so-called multi-touch gesture in which the user touches the operation unit 43, such as a touch screen, with two fingers at the same time. Here, the number of fingers used in the multi-touch gesture is not limited to two and may be three or more.

FIGS. 11A to 11D illustrate other examples of the structure of an authentication figure displayed on the display unit 32 of the multifunction peripheral 3a.

As illustrated in FIGS. 11A and 11B, the authentication-figure generating unit 203 of the print server 2 generates multiple ancillary FIGS. 214f and 214g, respectively. At the same time, as illustrated in FIGS. 11C and 11D, the authentication-figure generating unit 203 of the print server 2 generates alphabetical character strings used for inputting multiple authentication figures.

A combination of one of these ancillary FIGS. 214f and 214g and one of the alphabetical character strings is transmitted by the authentication-figure transmitting unit 204 to the multifunction peripheral 3a. The combination is then displayed on the display unit 32 of the multifunction peripheral 3a.

By referring to the combination of the ancillary FIG. 214f or 214g and the alphabetical character string displayed on the display unit 32 of the multifunction peripheral 3a, the user 5a performs an input operation by tracing, on the operation unit 43 of the mobile terminal 4a, positions of the ancillary FIG. 214f or 214g that are associated with corresponding alphabetical characters in accordance with the alphabetical character string.

Note that the ancillary FIG. 214f or 214g may be transmitted to the mobile terminal 4a, whereas the alphabetical character string may be transmitted to the multifunction peripheral 3a. This permits multiple input patterns to be generated easily in accordance with combinations of ancillary figures and alphabetical character strings and offers improved security.

Second Exemplary Embodiment

A second exemplary embodiment differs from the first exemplary embodiment in that characters are used in authentication instead of figures. Components having functions similar to those of the first exemplary embodiment are denoted by similar reference numerals. The following describes components that are different from those of the first exemplary embodiment. Note that the print server 2, the multifunction peripherals 3a to 3c, and the mobile terminal 4a are replaced with a print server 2A, multifunction peripherals 3A to 3C, and a mobile terminal 4A, respectively.

Configuration of Print Server

Figure 12:
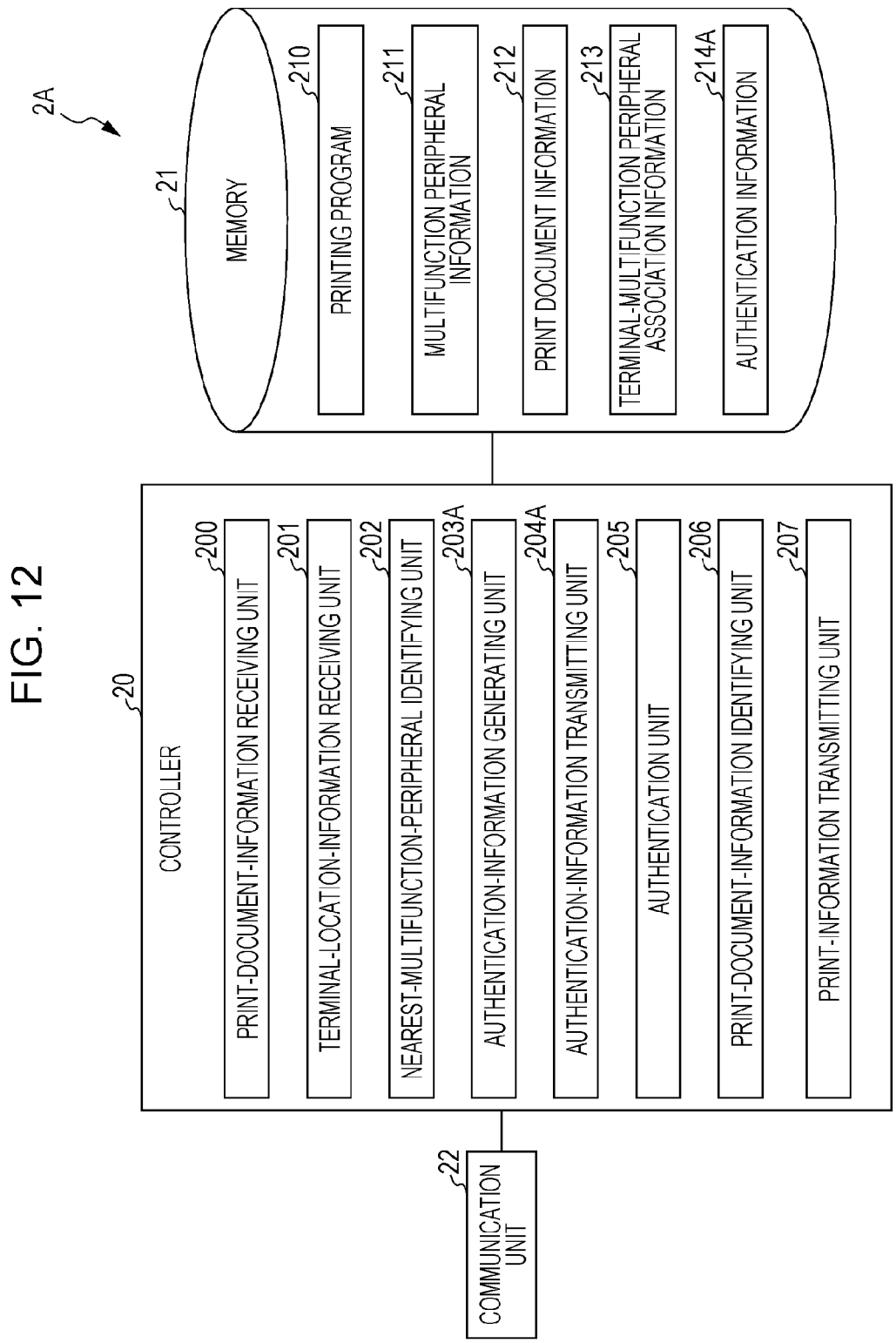
FIG. 12 is a block diagram illustrating an example of the configuration of a print server according to a second exemplary embodiment.

FIG. 12 is a block diagram illustrating an example of the structure of the print server 2A according to the second exemplary embodiment.

The print server 2A differs from the print server 2 according to the first exemplary embodiment in that the print server 2A includes an authentication-information generating unit 203A and an authentication-information transmitting unit 204A.

The authentication-information generating unit 203A generates authentication information used by the multifunction peripherals 3A to 3C during authentication of the mobile terminal 4A. The authentication-information generating unit 203A associates the authentication information with a registration identifier of the mobile terminal 4A, the ID of a multifunction peripheral identified by the nearest-multifunction-peripheral identifying unit 202, and the ID of print document information; and stores them as authentication information 214A.

The authentication-information transmitting unit 204A generates authentication reference information from the authentication information 214A generated by the authentication-information generating unit 203A, and transmits the authentication reference information to the multifunction peripheral identified by the nearest-multifunction-peripheral identifying unit 202.

The authentication information 214A is information for associating with each other the registration identifier, the authentication information generated by the authentication-information generating unit 203A, and the ID of the multifunction peripheral to which this authentication reference information is transmitted.

Configuration of Multifunction Peripheral

Figure 13:
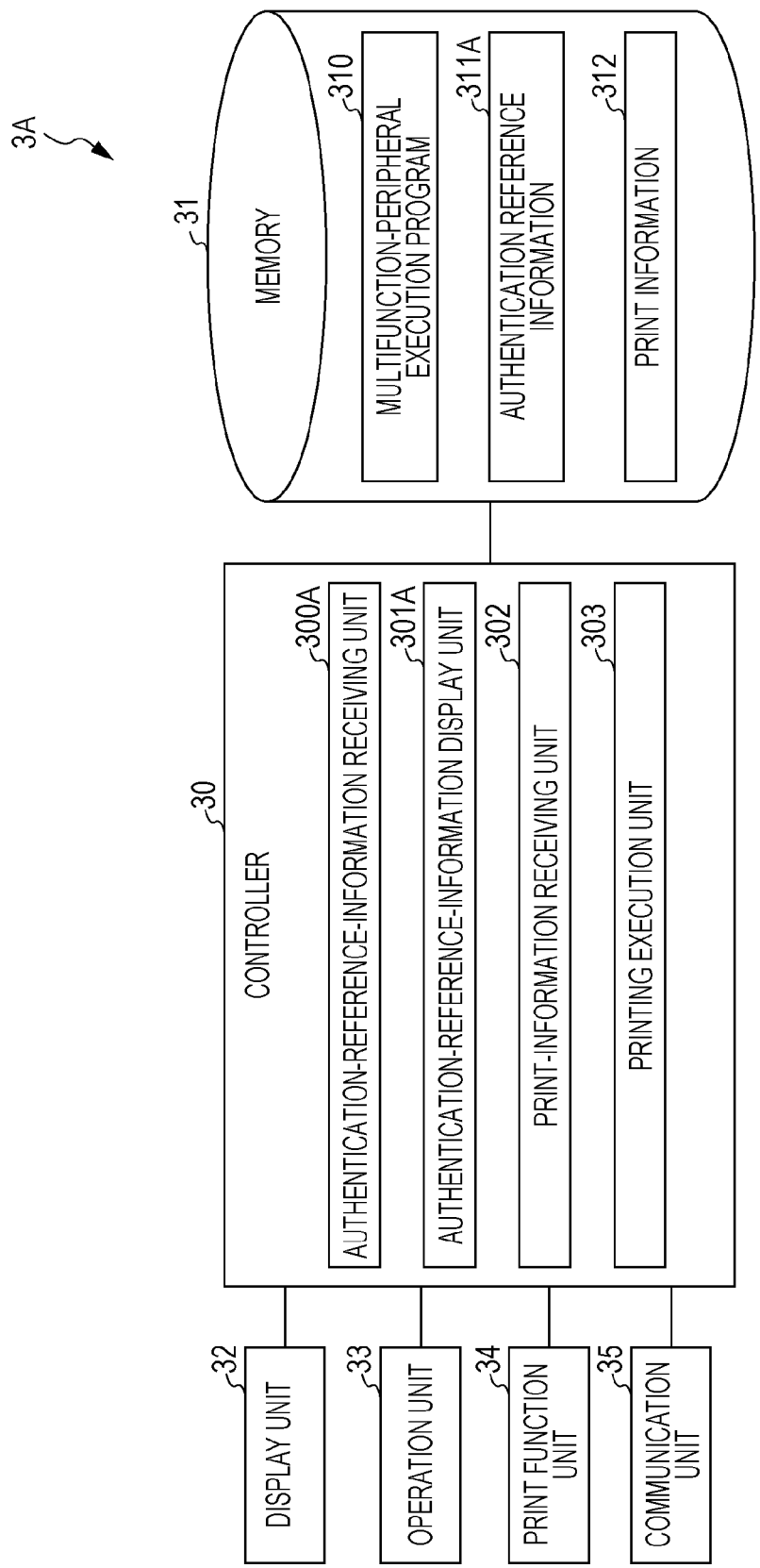
FIG. 13 is a block diagram illustrating an example of the configuration of a multifunction peripheral according to the second exemplary embodiment.

FIG. 13 is a block diagram illustrating an example of the configuration of the multifunction peripheral 3A according to the second exemplary embodiment.

The multifunction peripheral 3A differs from the multifunction peripheral 3a according to the first exemplary embodiment in that the multifunction peripheral 3A includes an authentication-reference-information receiving unit 300A and an authentication-reference-information display unit 301A.

The authentication-reference-information receiving unit 300A receives authentication reference information from the print server 2A, and stores it as authentication reference information 311A in the memory 31.

The authentication-reference-information display unit 301A displays the authentication reference information 311A on the display unit 32 at a timing described later.

Configuration of Mobile Terminal

Figure 14:
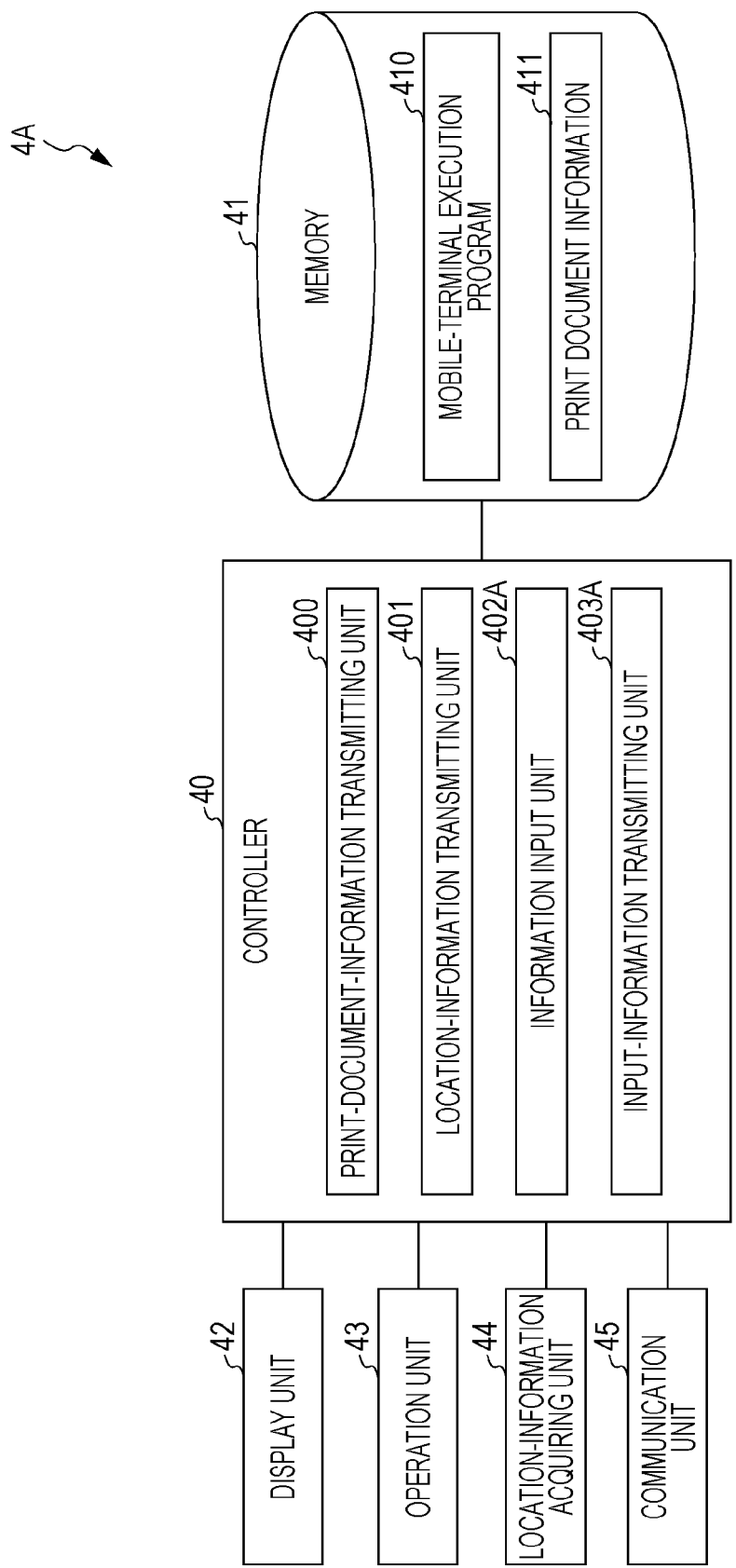
FIG. 14 is a block diagram illustrating an example of the configuration of a mobile terminal according to the second exemplary embodiment.

FIG. 14 is a block diagram illustrating an example of the configuration of the mobile terminal 4A according to the second exemplary embodiment.

The mobile terminal 4A differs from the mobile terminal 4a according to the first exemplary embodiment in that the mobile terminal 4A includes an information input unit 402A and an input-information transmitting unit 403A.

The information input unit 402A displays, on the display unit 42, a screen for receiving input of information used for authentication; and inputs information on the basis of an operation performed by the user 5a on the operation unit 43.

The input-information transmitting unit 403A transmits the information input by the information input unit 402A to the print server 2A.

Operation in Printing System

Now, operation according to the second exemplary embodiment will be described for 1) a document information reception operation, 2) an authentication operation, and 3) a printing operation. Here, 3) the printing operation (steps S208 to S210 and S302 and S303 of FIG. 17) is similar to that of the first exemplary embodiment, and thus a description thereof is omitted.

Figure 17:
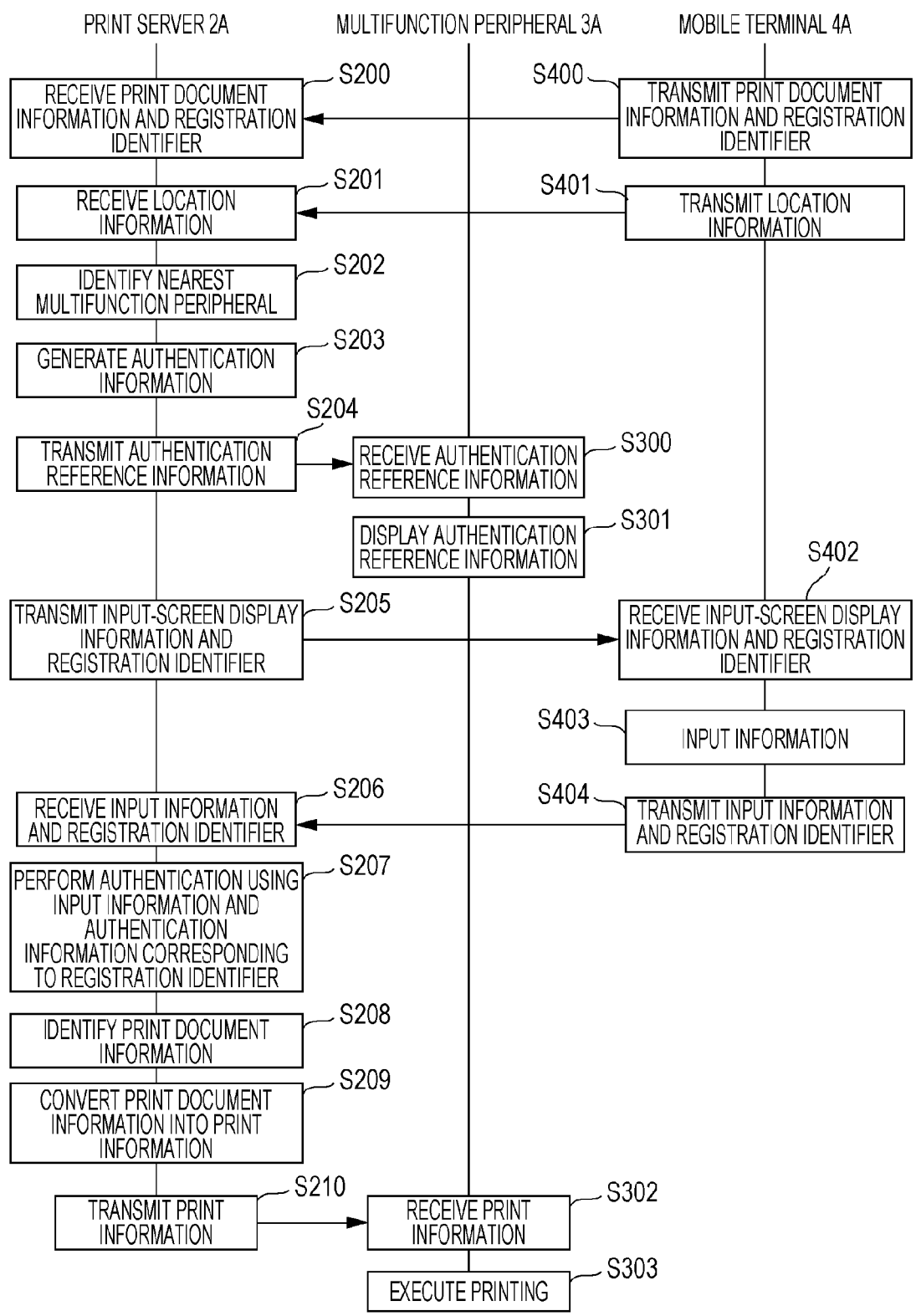
FIG. 17 is a flowchart illustrating an example of an operation performed in the printing system according to the second exemplary embodiment.

FIG. 17 is a flowchart illustrating an example of an operation performed in the printing system 1 according to the second exemplary embodiment.

1) Document Information Reception Operation

First, the user 5a operates the mobile terminal 4A and initiates communication with the print server 2A in order to register in the print server 2A the desired print document information 411 to be printed.

Upon permitting registration, the print server 2A generates a unique registration identifier that represents print information to be registered this time. The print server 2A then transmits registration permission information which contains the generated registration identifier to the mobile terminal 4A.

Upon receipt of the registration permission information, the print-document-information transmitting unit 400 of the mobile terminal 4A transmits a registration request, the registration identifier contained in the registration permission information, and the print document information 411 to the print server 2A (S400). Also, the location-information acquiring unit 44 of the mobile terminal 4A acquires information on the current location, for example, "latitude 35.4661, longitude 139.6227" at a detection date and time "Jan. 25, 2012 16:50". The location-information transmitting unit 401 then transmits the location information to the print server 2A (S401). The mobile terminal 4A also stores the registration identifier contained in the registration permission information, in the memory 41.

The print-document-information receiving unit 200 of the print server 2A receives the registration request, the registration identifier, and the print document information 411 (S200), and stores them as the print document information 212 in the memory 21.

Also, the terminal-location-information receiving unit 201 of the print server 2A receives the location information transmitted from the mobile terminal 4A (S201), and stores the location information "latitude 35.4661, longitude 139.6227" and the detection date and time "Jan. 25, 2012 16:50" in the terminal-multifunction peripheral association information 213 illustrated in FIG. 6.

Subsequently, the nearest-multifunction-peripheral identifying unit 202 identifies the multifunction peripheral 3A (MFP-001) ("latitude 35.466188, longitude 139.622715") located in the vicinity of (for example, located nearest) the mobile terminal 4A, in accordance with the location information "latitude 35.4661, longitude 139.6227" of the mobile terminal 4A and the multifunction peripheral information 211 stored in the memory 21 illustrated in FIG. 5 (S202). The nearest-multifunction-peripheral identifying unit 202 stores the ID of the identified multifunction peripheral 3A in the terminal-multifunction peripheral association information 213 illustrated in FIG. 6.

2) Authentication Operation

Subsequently, the authentication-information generating unit 203A generates authentication information used by the multifunction peripheral 3A during authentication of the mobile terminal 4A (S203). The authentication-information generating unit 203A associates the authentication information with the registration identifier received from the mobile terminal 4A and the ID "MFP-001" of the multifunction peripheral 3A identified by the nearest-multifunction-peripheral identifying unit 202, and stores them as the authentication information 214A.

At this time, the authentication-information generating unit 203A sets, as the validity expiration date and time of the authentication information, a time point that is a predetermined period, for example, ten minutes, after the information generation date and time.

The authentication-information transmitting unit 204A generates authentication reference information from the authentication information generated by the authentication-information generating unit 203A, and transmits the authentication reference information to the multifunction peripheral 3A (MFP-001) identified by the nearest-multifunction-peripheral identifying unit 202 (S204).

The authentication reference information is text information representing a question to the user. The question is regarding a matter which is difficult for a person other than the user to know, for example, a question regarding the attribute or content of the print document information 212 that has been registered by the user.

During generation of the authentication reference information, the authentication-information transmitting unit 204A extracts an attribute, such as the creator or the generation date and time of the print document information, from the print document information 212. If the extracted attribute is the creator of the print document information 212, the authentication-information transmitting unit 204A generates authentication reference information representing "Who is the creator of the registered print document information?". If the extracted attribute is the generation date and time of the print document information 212, the authentication-information transmitting unit 204A generates authentication reference information representing "When is the generation date and time of the registered document information?".

Alternatively, when authentication reference information is generated from the content of the print document information 212, image recognition is performed on the registered print document information 212. If the result of image recognition indicates that the print document information 212 contains a text area, the authentication-information transmitting unit 204A extracts the position and size of the text area in the print information, performs character recognition on the text area so as to extract text information, and generates authentication reference information representing "Please input characters contained in the registered print document information".

If there are multiple text areas, the authentication-information transmitting unit 204A selects a sub-area containing a predetermined number of characters from the multiple text areas, and generates authentication reference information representing that "Please input characters contained in this area of the registered print information". The predetermined number of characters is a length of a character string that is not troublesome for the user to input and is, for example, five characters or more and eight characters or less.

In this case, the authentication reference information contains the size of the print document information 212, the position and size of the text area in the print document information 212, and text information.

Then, the authentication-reference-information receiving unit 300A of the multifunction peripheral 3A receives the authentication reference information from the print server 2A (S300), and stores it as the authentication reference information 311A in the memory 31. The authentication-reference-information display unit 301A displays the content of the authentication reference information on the display unit 32 (S301).

Figure 15:
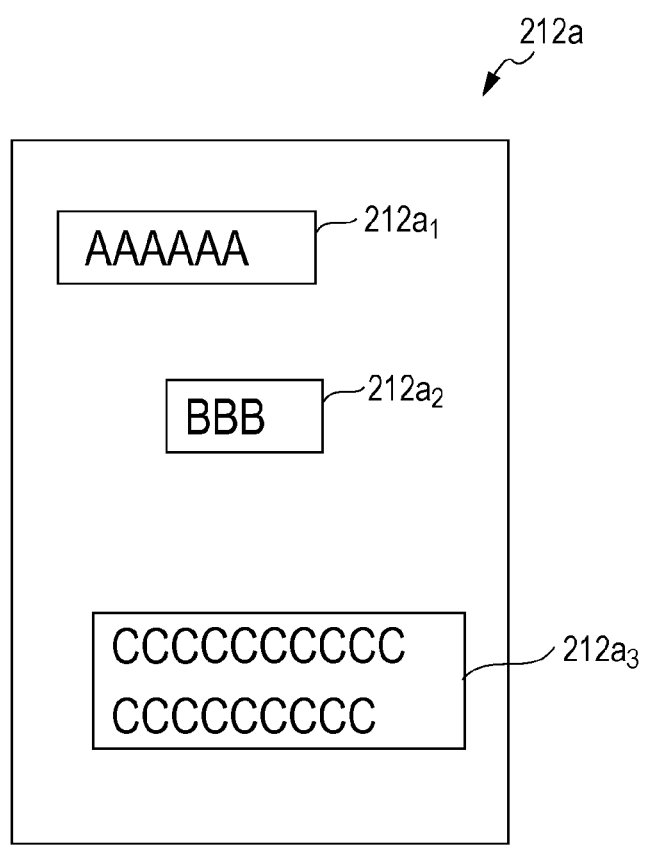
FIG. 15 illustrates an example of the structure of print document information.

FIG. 15 illustrates an example of the structure of print document information 212a.

The print document information 212a, which is an example of the print document information 212, includes text areas 212a$_1$ to 212a$_3$. Note that areas other than the text areas may contain images or the like.

Figure 16:
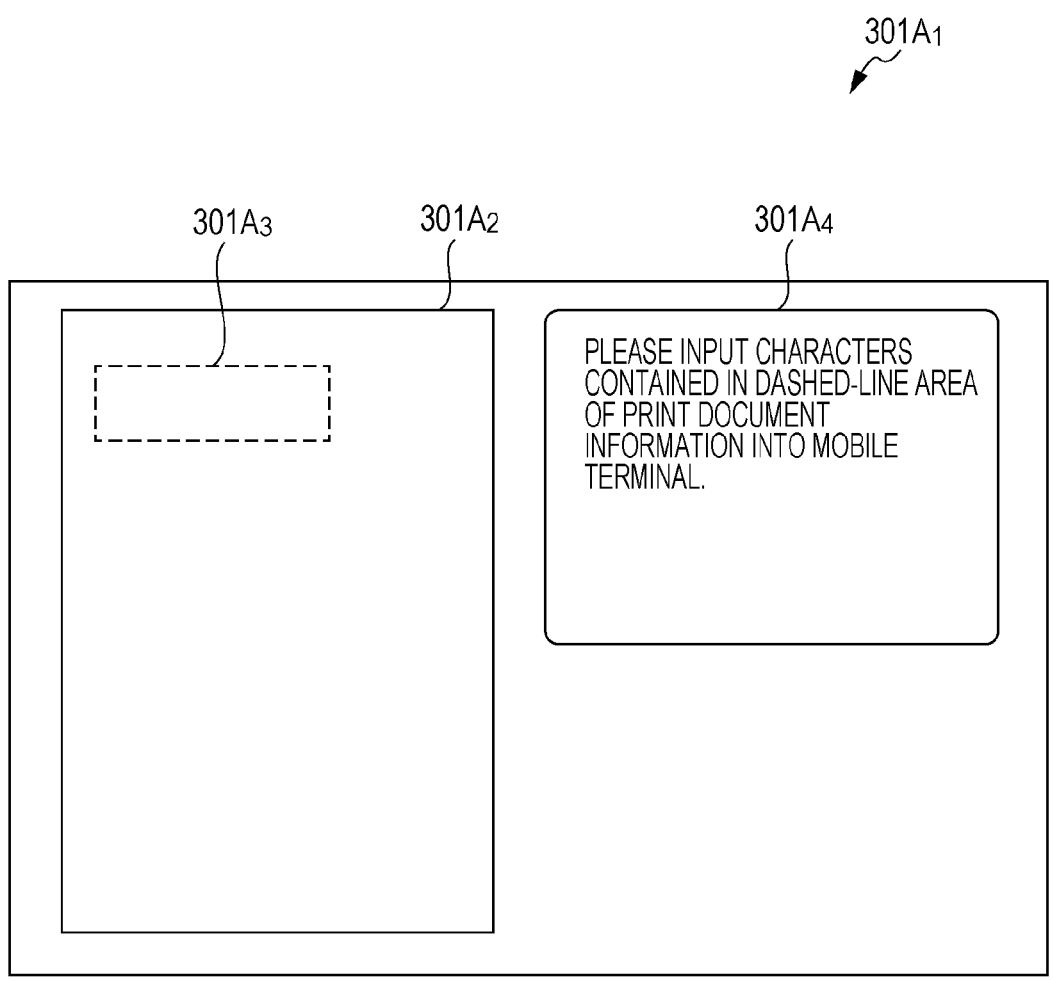
FIG. 16 illustrates an example of the structure of authentication reference information generated on the basis of the content of print document information.

FIG. 16 illustrates an example of the structure of authentication reference information generated on the basis of the content of the print document information 212a.

An authentication-reference-information display screen 301A$_1$, which is authentication reference information displayed on the display unit 32 of the multifunction peripheral 3A, includes a document contour 301A$_2$ indicating a contour of the print document information 212a, a specified area 301A$_3$ indicating the position of a text area in the document contour 301A$_2$, and a message 301A$_4$ displaying the content of a direction. Although illustrated as a rectangular area in FIG. 16, the specified area 301A$_3$ is not limited to a rectangular area and may have any given shape.

Then, the print server 2A transmits, to the mobile terminal 4A, the registration identifier and information for displaying an input screen (S205).

The information input unit 402A of the mobile terminal 4A receives the registration identifier and the information for displaying an input screen (S402), and displays the input screen.

Subsequently, the user 5a checks the authentication-reference-information display screen 301A$_1$ displayed on the display unit 32 of the multifunction peripheral 3A, and inputs information to the mobile terminal 4A.

The information input unit 402A receives text information input from the user 5a, for example, an answer "User A" to the question "Who is the creator of the registered print document information?" or an answer "AAAAAA" for the direction "Please input characters contained in an dashed-line area of the registered print document information into the mobile terminal" (S403). Then, the input-information transmitting unit 403A of the mobile terminal 4A transmits the input text information and the registration identifier to the print server 2A (S404).

If the registration identifier received in step S402 is not stored in the memory 41, the mobile terminal 4a need not display a screen for receiving input of information used in authentication on the display unit 42.

The authentication unit 205 of the print server 2A receives the registration identifier and input information transmitted from the input-information transmitting unit 403A of the mobile terminal 4A (S206), and compares the input information with the authentication information 214A corresponding to the registration identifier for verification. If the pieces of information match at a predetermined percentage or higher, the print server 2A authenticates the user (S207).

If the authentication is successful in step S207, the print-document-information identifying unit 206 identifies the print document information 212 on the basis of the registration identifier (S208). The print-information transmitting unit 207 transmits the identified print document information 212 to the multifunction peripheral 3A in a step following step S209.

In the first and second exemplary embodiments above, functions of the individual units 200 to 207 of the controller 20, the individual units 300 to 303 of the controller 30, and the individual units 400 to 403 of the controller 40 are implemented by programs but all or some of these units may be implemented by hardware, such as application specific integrated circuits (ASICs). Alternatively, the programs used in the first and second exemplary embodiments above may be provided after being stored on a recording medium, such as a Compact Disc-Read Only Memory (CD-ROM). Also, switching of the steps described in the first and second exemplary embodiments above, deletion of some of the steps, addition of a new step, or the like may be performed within the scope that does not change the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
a plurality of printing apparatuses each of which prints print document information and outputs a document;
a terminal that stores print document information, that acquires information on a location of the terminal and generates location information, and that transmits the print document information and the location information; and
a print server that receives, from the terminal, the print document information and the location information of the terminal, that generates authentication information and associates the generated authentication information with the print document information, that identifies one printing apparatus from among the plurality of printing apparatuses in accordance with the location information of the terminal and location information of the plurality of printing apparatuses, and that transmits the generated authentication information to the identified printing apparatus,
wherein the identified printing apparatus displays authentication reference information in accordance with the authentication information received from the print server,
wherein the terminal receives input of information that is based on the authentication reference information and transmits the input information to the print server, and
wherein upon receipt of the input information from the terminal, if the input information matches the authentication information, the print server transmits the print document information associated with the authentication information to the identified printing apparatus.

2. The printing system according to claim 1,
wherein the authentication reference information includes ancillary information for assisting input of information,
wherein the print server transmits the ancillary information to the terminal, and
wherein the terminal receives the ancillary information from the print server and displays the ancillary information when the terminal receives input of information that is based on the authentication reference information.

3. A printing method comprising:
acquiring information on a location of a terminal to generate location information;
transmitting, from the terminal, print document information stored in the terminal and the location information generated in the terminal;
receiving, in a print server, from the terminal, the print document information and the location information of the terminal;
generating, in the print server, authentication information and associating the generated authentication information with the print document information;
identifying, in the print server, one printing apparatus from among a plurality of printing apparatuses in accordance with the location information of the terminal and location information of the plurality of printing apparatuses, each of the plurality of printing apparatuses being configured to print document information and to output a document;
transmitting, from the print server to the identified printing apparatus, the generated authentication information;
displaying, in the identified printing apparatus, authentication reference information in accordance with the authentication information received from the print server;
receiving, in the terminal, input of information that is based on the authentication reference information and transmitting the input information to the print server; and
transmitting, upon receipt of the input information from the terminal, if the input information matches the authentication information, the print document information associated with the authentication information to the identified printing apparatus from the print server.

4. An information processing apparatus comprising:
a receiving unit that receives, from a terminal, print document information and location information of the terminal;
a generating unit that generates authentication information and associates the generated authentication information with the print document information;
an identifying unit that identifies one printing apparatus from among a plurality of printing apparatuses, in accordance with the location information of the terminal and location information of the plurality of printing apparatuses;
a transmitting unit that transmits the generated authentication information to the identified printing apparatus; and
a print information transmitting unit that transmits, if information input to the terminal after authentication reference information is displayed in the identified printing apparatus in accordance with the authentication information matches the authentication reference information, the print document information associated with the authentication information to the identified printing apparatus.

5. A non-transitory computer readable medium storing a program causing a computer to execute a process, the process comprising:
receiving, from a terminal, print document information and location information of the terminal;
generating authentication information and associating the generated authentication information with the print document information;
identifying one printing apparatus from among a plurality of printing apparatuses, in accordance with the location information of the terminal and location information of the plurality of printing apparatuses;
transmitting the generated authentication information to the identified printing apparatus; and
transmitting, if information input to the terminal after authentication reference information is displayed in the identified printing apparatus in accordance with the authentication information matches the authentication reference information, the print document information associated with the authentication information to the identified printing apparatus.

\* \* \* \* \*